June 16, 1936.  H. C. LORD  2,044,393
METHOD OF FORMING JOINTS
Original Filed Feb. 7, 1930
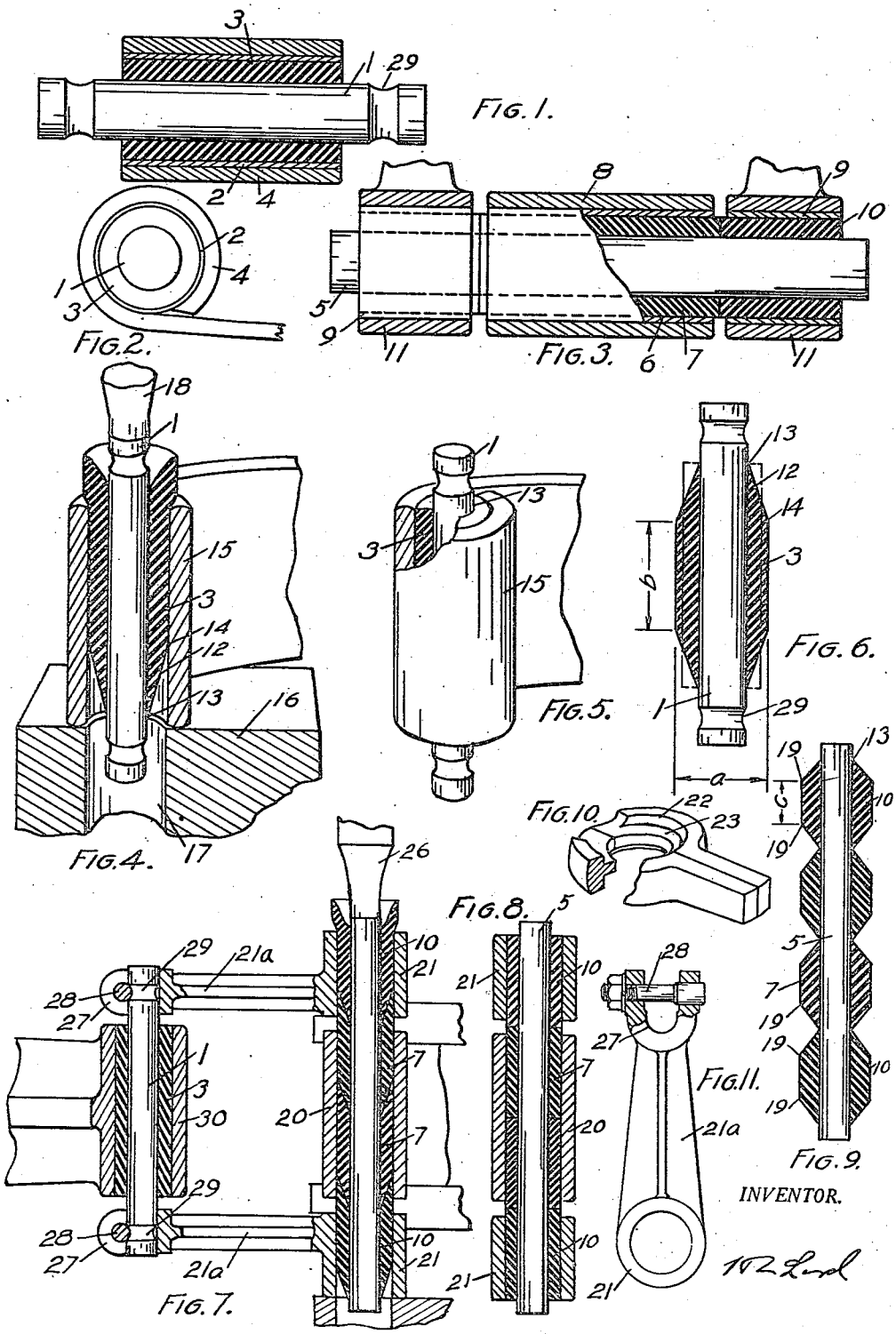
INVENTOR.

Patented June 16, 1936

2,044,393

UNITED STATES PATENT OFFICE 2,044,393

METHOD OF FORMING JOINTS

Hugh C. Lord, Erie, Pa.

Original application February 7, 1930, Serial No. 426,498. Divided and this application January 15, 1932, Serial No. 586,786. Renewed December 26, 1933

18 Claims. (Cl. 29—88.2)

The present invention is designed to form joints involving a rubber bushing which is designed to permit of the relative movement to which the parts connected by the rubber are subjected through the distortion of the rubber. Such joints have heretofore been made, as for example, the joint illustrated in my Patent #1,452,693. If the rubber is bonded both to the central pin and the outer sleeve of the joint, particularly if bonded by vulcanization under heat, the joint is under tension due to the shrinkage of the rubber in cooling. Other joints have been made in which a rubber bushing of larger cross dimension than the final joint is used and is sufficiently stretched lengthwise by forcing it into the space between the pin and outer sleeve to put the rubber under very severe compression crosswise, the endwise tension being sufficient to maintain this compression and engagement of the rubber with the pin and sleeve surfaces. The latter structure presents some difficulty in fabrication as to the introduction of the rubber to the confining space and special tools and methods have been devised for accomplishing this purpose.

In the present invention, there are utilized some of the advantages of both of said methods. In carrying out the invention, at least in some phases of it, the rubber bushing is bonded to the central pin and therefore has an initial length at the center corresponding to the length of the joint. With such a rubber bushing, having an initial cross dimension larger than the interior of the sleeve the rubber bushing can be readily forced into the sleeve by pressure exerted on the pin so that the rubber as a whole is pulled by the pin into the space as distingushed from being pushed into the space as has heretofore been practiced with joints having the rubber under compression. With this arrangement it is preferable to initially form the rubber of a volume equal to the capacity of the space into which it is finally confined. A simple manner of providing for this equalization is to initially taper the ends of the rubber forming the joint so as to compensate for the volume of rubber in the body of the joint outside of the final dimension.

Among the advantages of such a joint is that it may be supplied with an outer shell forming a joint element which is of general application by introduction into the member to be serviced in cartridge fashion, or by reason of the fact that the pin affords a simple means of introduction of rubber bonded to the central pin may be forced into the final opening, or place of use, such as a spring eye without the preliminary compression in a metal shell.

This advantage may be utilized where there are a plurality of joint units on a single pin, thus providing a greater turning capacity for the joint as the several spools, or bushings of rubber may be readily forced endwise into the several sleeves so as to provide the ultimate plural spool joint.

With the rubber held in its position lengthwise at the pin and distorted as it is forced into place in a smaller sleeve the rubber finally takes a position under high cross compression and has a shear distortion starting approximately at neutral at the center of the joint and increasing in such shear distortion toward the ends of the joint. This distortion and effort of the rubber to return to its original shape maintains the mass of rubber under high cross compression as the joint is subjected to use. On the other hand, the rubber being bound to the central pin which, by reason of its smaller surface, is subjected to a greater tendency to movement with relation to the rubber is assured of a continuous contact and consequent lack of wear through a wide range of rotative movement. While it is possible with this joint to subject the rubber to very high compression, nevertheless the joint is of greater capacity and durability even though of lighter compression because under any condition there cannot be a separation of the rubber from the engaged surface of the pin. The engaged surface on the sleeve is much greater than at the pin and consequently difficulty with relation to such surface is very much less. Features and details of the invention will appear more fully from the specification and claims.

The application herein is a division of application filed by me Feb. 7, 1930, Serial Number 426,498.

The accompanying drawing illustrates a preferred embodiment of the joint and the method of producing the same as follows:—

Fig. 1 shows a central section of a single joint.
Fig. 2 an end view of the same.
Fig. 3 a central section of a joint made up of a number of elements, or units.
Fig. 4 a section showing the introduction of the rubber to a joint sleeve.
Fig. 5 a joint similar to that shown in Fig. 4. completed.
Fig. 6 a detached view of the central pin and rubber unit prior to its introduction to the joint.

Fig. 7 a sectional view showing the joints as applied to a rear spring shackle.

Fig. 8 a sectional view of a double joint, as shown in Fig. 7.

Fig. 9 a sectional view of the rubber as arranged on the pin for a double joint.

Fig. 10 a perspective view of a clamp used in holding the parts during the introduction of the rubber of the double joint, as illustrated in Fig. 7.

Fig. 11 a side elevation of one of the shackle hangers.

In the single joint, 1 marks the central pin. This is exemplified as a solid extended pin, but is not limited to this form. As illustrated in Fig. 1, 2 marks the outer sleeve, or shell, and 3 a bushing of rubber in the space between the shell and pin. As shown in Figs. 1 and 2, the shell is pressed into a spring eye 4. In Fig. 3 a joint having a plural number of joint elements is shown comprising a common central pin 5, a central outer shell 6, and a bushing 7 of rubber, 8 a joint member, such as a spring eye, 9 shells for the outer joint members, 10 rubber bushings between the shells 9 and the pin and 11 outer members, such as shackle hangers. In this structure the pin is floating. The outer spools, or bushings 10 are ordinarily half the length of the central member, their total equalling the central member. On rotating the central member relatively to the end members the pin takes an intermediate position. Thus the two joints are capable of a movement double that of a single unit joint with the same stress on the rubber.

Preferably in forming the joint, the rubber is formed on the pin and bonded to the pin preferably by vulcanization so that there is a definite union between the pin and rubber. The rubber is initially formed of greater cross dimension, as indicated at $a$, Fig. 6, than the ultimate dimension which in Fig. 6 is indicated in dotted lines. The ends of the rubber are preferably tapered at 12, the end of this taper at 13 corresponding with the ultimate length of the joint. The outer termini of the tapered surfaces 12 are so positioned relatively to the cross dimension $a$ as to assume a position in a plane at right angles to the axis of the joint and passing through the points 13 when the rubber is compressed within the space provided for it in the joint. Thus the distance $b$ between the termini 14 is greater, or less depending on the cross dimension $a$. If it is desired to place the rubber under greater distortion the dimension $a$ is increased and the dimension $b$ decreased so that the volume of rubber in its initial form equals the space in which the rubber is finally forced, as indicated in dotted lines in Fig. 6. The exact shape of the end to accomplish this purpose may be approximately determined by making a greater taper, or even a square end, and placing it in the joint and then cutting the end of the resultant structure to the shape desired. When this structure is released, it will give approximately an initial shape that will give the desired shape under compression.

After the rubber has been thus formed on the pin it is lubricated, preferably with a rubber cement, but possibly by other lubricants, such as gasoline and entered in the end of a joint member, such as a spring eye 15. The spring eye is placed on a platen 16 having an opening 17 in register with the spring eye and pressure is exerted on the pin 1 by a plunger 18, the plunger being a part of any device designed to exert pressure. The tapered end pilots the bushing into the opening. The pin is forced forward until the rubber is stretched rearwardly and in shear sufficiently to reduce its diameter to that of the interior of the sleeve. The rubber is forced through the spring eye to a point bringing the point 14 into register with the end of the spring eye, or sleeve. If properly proportioned, this will bring the point 14 at both ends into register at the same time. Upon the release of the pin it swings back to the central position. The rubber is, therefore, put under very severe cross compression and at the same time under shear distortion from a neutral zone at the center extending toward each end, the shear increasing from said neutral zone to the end. This distortion in shear which, of course, involves a longitudinal stretching of the rubber as well maintains this cross compression throughout the life of the joint, the effort being, of course, to return to its original position and this effort increasing the cross pressure.

It will be understood that well-made rubber is almost incompressible so that any variation in cross size is accomplished through a distortion endwise. This endwise and shear distortion gives to the joint stability endwise and relieves the rubber at the center of a great portion of the stress which is necessary to maintain the cross pressure so that this rubber at the center which is opposed to the greater mass of rubber adjacent to the shell may be better disposed to maintain the stresses to which it is subjected in the movement of the joint, particularly the rotative movements of the joint.

The bonding at the center removes the weakness usually found in joints of this type in that there is a definite union between the pin and the rubber and maintains the rubber against movement under normal stresses of use.

The utilization of the pin as a means for introducing the rubber to the joint so simplifies this part of the process that it is feasible to force these joints directly into the place of use, such as the spring eye, because such introduction may be readily accomplished without the use of special tools. All that is necessary is some means for subjecting the pin to pressure which may be followed up with reasonable rapidity. In this way it is possible to reduce the size of the spring eye and thus increase its holding strength because by dispensing with the intermediate metallic material an equal wall of rubber may be formed with a smaller spring eye.

While I prefer the compressing of the rubber in the joint by forcing the pin endwise through the confining sleeve, it will be understood that in the broader phases of the invention the rubber may be brought to its compressed state and extension and of smaller dimension than a confining sleeve having an ultimate transverse dimension less than the original transverse dimension of the rubber by other manner of treatment.

In forming the plural joint, the rubber is placed upon a pin in sections, as shown in Fig. 9. The ends of each unit are beveled, this bevel being controlled so as to give to the rubber as a whole the proper volume and the proper distortion and the initial cross dimension of each unit is such as to give the rubber its proper cross compression. If the central bushing is made in a continuous piece, then the end members 10 ordinarily would be made of slightly larger diameter with the points 19 such as to make the lengths $c$ comparatively short so that the shear distortion would correspond approximately to the shear distortion of the center. Another way of balancing the shear distortion is to divide the center spool, as shown in Fig. 9, into two sections. Thus there are four sections, two sections 10 and two sections 7. Under these conditions, all of these sections may be of exactly the same shape and will be equally stressed in the final position. The ends of the tapers 13 of each of the adjoining sections may come together, as clearly shown in Fig. 7, so that when the rubber is placed in the joint and the ends of the sections squared up these ends of the rubber will come practically into contact. Thus the central member of the joint, as illustrated in Fig. 9, in its final position as illustrated in Fig. 8, brings the two center ends of the sections 7 into close contact. In forcing this unit with the central pin and its plural joints into place, as for instance into place in a spring shackle the central member 20, which is a spring eye, and the sleeves 21 at the lower ends of the shackle hangers 21a are all clamped together by clamps 22, these clamps having shoulders 23 spacing the sleeves 21 and spring eye 20 as may be desired. This assembly is placed on a die 24 with an opening 25 in register with the sleeve opening, the joint put in place, and subjected to the action of a plunger 26 which drives all the sections as a whole into place in the several sleeves. As the pressure is relieved these several joints are centered and the joint at the adjoining ends of the sleeves 21 and spring eye protrude and are practically in contact. This bracing permits of placing the sleeves 21 and spring eyes slightly closer together without danger of moving into contact under side thrust. A single joint is placed in a goose neck 30. The hangers 21a are provided with slots 21 for receiving the ends of the joint in the goose neck and cross bolts 28 extend between the walls of the slots. These cross bolts engage grooves 29 in the pin 1 and thus clamp the shackle hangers 21a on said pin, thus rigidily tying the two shackle links 21a together through the pin 1. It is desirable to place the double joint in the spring eye where the hangers are of the compression type in that the turning movement of the spring eye due to the flexing of the spring is usually about double the turning movement in the goose neck.

The separation of the rubber into sections as are the sections 7 shown in Fig. 9 may be used in single joints where the length makes this desirable, or where it may be desired to more nearly balance the shear distortion throughout the length of the joint.

What I claim as new is:—

1. The method of forming joints which consists in bonding a rubber bushing having tapered ends on to a central pin and forcing the bushing into a sleeve sufficiently smaller than the bushing to place the rubber under high transverse pressure and longitudinal shear distortion.

2. The method of forming joints which consists in bonding a rubber bushing having tapered ends on to a central pin and forcing the bushing into a sleeve sufficiently smaller than the bushing to place the rubber under high transverse pressure and longitudinal shear distortion by force exerted on the pin.

3. The method of forming joints which consists in bonding a rubber bushing having tapered ends on to a central pin, the bond extending through approximately the full length of the finished rubber joint and forcing the bushing into a sleeve sufficiently smaller than the bushing to place the rubber under high transverse compression and longitudinal shear distortion.

4. The method of forming joints which consists in bonding a rubber bushing having tapered ends on to a central pin, the bond extending through approximately the full length of the finished rubber joint and forcing the bushing into a sleeve sufficiently smaller than the bushing to place the rubber under high transverse compression and longitudinal shear distortion by force exerted on the pin.

5. The method of forming joints which consists in bonding a rubber bushing having tapered ends on to a central pin, providing a sleeve of less transverse dimension than the bushing and positioning the sleeve in alinement with the bushing and forcing, by pressure on the pin, the bushing into the sleeve as it is presented to the sleeve to place the rubber under high transverse compression and longitudinal shear and distortion, the rubber having an initial volume approximately equal to the space between the sleeve and pin and of a length approximating the initial length of the rubber.

6. The method of forming joints having a central pin and a series of rubber bushings having tapered ends bonded by a surface union on said central pin, said bushings through the taper of the ends providing an expansion space between their adjacent ends, and forcing said series of rubber bushings into a sleeve of less cross dimension than the bushings.

7. The method of forming joints having a central pin and a series of rubber bushings having tapered ends bonded by a surface union on said central pin, said bushings through the taper of the ends providing an expansion space between their adjacent ends, and forcing by pressure on the pin said series of rubber bushings into a sleeve of less cross dimension than the bushings.

8. The method of forming joints having a single central pin and a plurality of joint elements thereon, which consists in forming a series of rubber bushings around the pin of greater cross dimension than the final joint and spacing the elements endwise to compensate for the elongation under radial compression, and assembling said bushings under radial compression and axial elongation.

9. The method of forming joints having a single central pin and a plurality of joint elements thereon, which consists in bonding a series of rubber bushings around the pin of greater cross dimension than the final joint and spacing the elements endwise to compensate for the elongation under radial compression, and assembling said bushings under radial compression and axial elongation.

10. The method of forming joints having a single central pin and a plurality of joint elements thereon, which consists in bonding a series of rubber bushings around the pin of greater cross dimension than the final joint and spacing the elements endwise to compensate for the elongation under radial compression, and assembling said bushings under radial compression and axial elongation, said bushings having tapered ends, the bonded surface approximating the ultimate length of each bushing in the joint.

11. The method of forming joints which consists in securing a rubber bushing having tapered ends on a pin, compressing the bushing radially and distorting the same to square the ends, and confining the rubber so compressed to complete a joint.

12. The method of manufacturing an oscillating joint which consists in mounting a plurality of rubber rings on the outer surface of a rigid member with portions of their sides in spaced relation, vulcanizing said rings to said surface so as to produce an integral bond between said rings and said inner member, and expanding said rings axially of said inner member to substantially fill the spaces therebetween by inserting said rings together with said inner member axially into an outer integral rigid sleeve having a smaller inner diameter than the normal outer diameter of said rings.

13. The method of forming joints which consists in permanently uniting in a unit an outer resilient rubber wall and a comparatively rigid center wall, reducing the radial dimension of the resilient wall by substantial extension of a portion of the resilient wall longitudinally sufficiently to place the rubber of the resilient wall under high radial compression and longitudinal tension, and confining the resilient rubber wall under such radial compression and longitudinal tension by an outer confining sleeve.

14. The method of forming joints which consists in permanently uniting a resilient rubber wall with a substantially rigid central member, reducing the radial dimension of the wall by substantial extension of a portion of the wall longitudinally sufficiently to place the rubber under high radial compression, and confining the rubber wall under such radial compression and longitudinal extension by an outer confining sleeve.

15. The method of forming joints which consists in permanently uniting in a unit an outer resilient wall and a substantially rigid center wall, reducing the radial dimension of the resilient wall by substantial extension of the outer portion of said resilient wall longitudinally sufficiently to place the rubber of the resilient wall under high radial compression with the outer portion of the rubber wall longitudinally extended and the body of the rubber wall in shear distortion, and confining the resilient wall under such radial compression, longitudinal tension and shear distortion by an outer confining sleeve.

16. The method of forming joints which consists in permanently uniting in a unit an outer resilient wall and a substantially rigid center wall, reducing the radial dimension of the resilient wall by substantial extension of the outer portion of said resilient wall longitudinally sufficiently to place the rubber of the resilient wall under high radial compression with the outer portion of the resilient wall longitudinally extended to a greater extent than the radial thickness of the resilient wall, and confining the resilient wall under such radial compression and longitudinal tension in its outer portion by an outer confining sleeve.

17. The method of forming joints which consists in permanently uniting in a unit an outer resilient rubber wall having tapered ends and a comparatively rigid center wall, reducing the radial dimension of the resilient wall by substantial extension of a portion of the resilient wall longitudinally sufficiently to place the rubber of the resilient wall under high radial compression and longitudinal shear distortion, and confining the resilient wall under such radial compression and longitudinal shear distortion by an outer confining sleeve.

18. The method of forming joints which consists in permanently uniting in a unit an outer resilient rubber wall having undulations and a comparatively rigid center wall, reducing the radial dimension of the resilient wall by extension of the crests of the undulations to substantially fill the spaces between the crests and place the rubber of the resilient wall under high radial compression, and confining the resilient rubber wall under such radial compression and extension of the crests by an outer confining sleeve.

HUGH C. LORD.